Aug. 28, 1956   E. WOLF   2,760,422
WEEDING-HOE
Filed Oct. 6, 1949
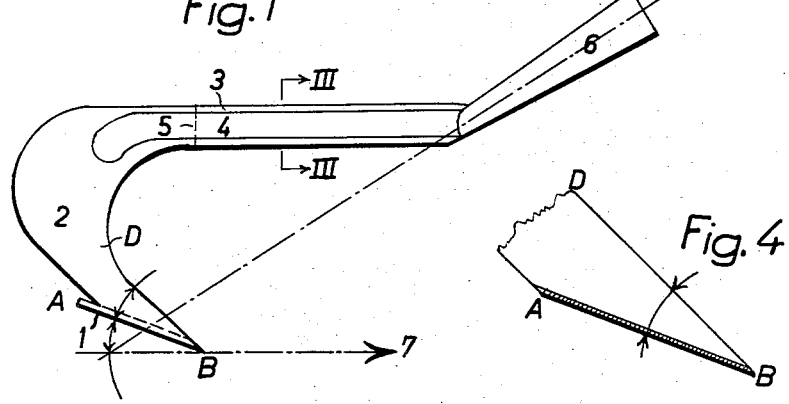
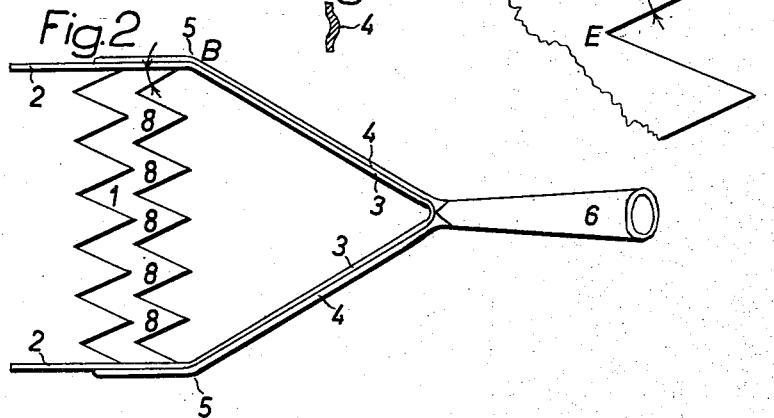
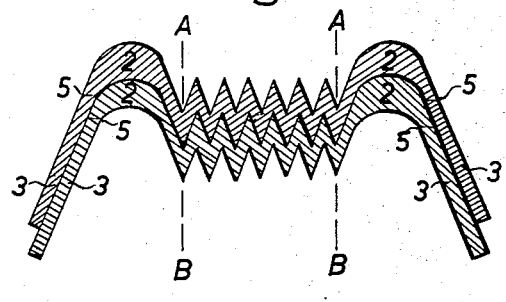
INVENTOR:
Elmar Wolf
BY
Richards & Geier
ATTORNEYS

United States Patent Office 2,760,422
Patented Aug. 28, 1956

2,760,422

WEEDING-HOE

Elmar Wolf, St. Wendel, Germany

Application October 6, 1949, Serial No. 119,881

Claims priority, application France October 7, 1948

1 Claim. (Cl. 97—63)

My invention relates to a weeding-hoe by employment of which in a drawing operation, is effected both the destruction of weeds and the crumbling of soil.

Weeding-hoes for this purpose already exist; they are of different constructions and more or less adequate in their performance. In principle they consist of a slightly inclined knife-blade, working in a horizontal plane beneath the soil-surface. This blade is fastened at both ends to special supports (holding-legs). Consequently this construction affords complicated and thereby costly manufacture.

The front-edge of these conventional soil-cutters is either straight or arrow-shaped (with a point in its center). That is obtained by corresponding fashioning of the blade or by adding a supplementary pointed blade.

The downward extended axis of handle and socket of the known weeding-hoes passes behind the blade; on the ground of practical experience, however, this downward extended handle-socket-axis step by step was put off more to the front.

It is an object of my invention to provide a novel weeding-hoe which presents essential advantages in its performance and in its construction over now existing implements. According to my invention the center blade, working in the horizontal plane, and the vertical blades sustaining it including the supports connected to the socket are manufactured in one piece punched out of a strip of sheet-steel of appropriate width practically without waste. After bending and stamping the blank into definite form, the socket is joined, the downward extended axis of which meets the horizontally working center blade in the line of traction before its rear edge.

Contrary to existing weeding-hoes my invention renders possible for the first time the routing of weeds growing in immediate vicinity of culture plants. For this purpose the front-edges are formed into arrow-shaped points at the bend lines between the horizontal center blade and the vertical blades sustaining it.

Therefore the front-edge of the center blade recedes at either end where the rectangularly upward-bent vertical blades join. The front-edge and the bend-line form an acute angle of less than 45 degrees, preferably of 22½ degrees.

For special tasks the front-edge congruent to the rear edge is zigzagged.

According to my invention the receding part of the front-edges of the vertical blades adjoining the bend-line also forms with this bend-line an acute angle of less than 45 degrees, preferably of 22½ degrees.

In a very useful form of execution the angles between the front-edges of the horizontal and vertical blades and the bend-line are equal.

In order to reinforce the tool the tapered supports adjoining the vertical blades are provided with a ridge and bent in, so that their ends meet, and are welded to the socket.

Referring to the drawings in which I have illustrated a preferred type of weeding-hoe according to my invention:

Fig. 1 is a side elevation of the weeding-hoe in working position.

Fig. 2 is a vertical view of the weeding-hoe.

Fig. 3 is a sectional view along the line III—III of Fig. 1.

Fig. 4 is an enlarged reproduction of the point of the vertical blades in immediate vicinity of the bend-line.

Fig. 5 is an enlarged reproduction of the center blade, working in the horizontal plane, in immediate vicinity of the bend-line.

Fig. 6 is a view of two blanks punched out of a strip of sheet-steel and formed to the weeding-hoe.

Referring to the illustration of the tool, the blade consists of a central portion 1 working in the horizontal plane to which are joined the receding vertical wing portions 2 bent upward along the bend-line AB; they taper off into the supports 3. To reinforce the tool the supports 3 are provided with a ridge 4 stabilizing the bend at the bend-line 5. The supports 3 are connected to the conical socket 6 by conventional means, preferably by welding.

According to my invention the weeding-hoe is held for work in the position illustrated in Fig. 1 so that the horizontally working blade 1 is inclined in an acute angle to the level direction 7 of work.

For most efficient transmission of the force of traction applied to the socket the downward extended socket-axis passes before the rear boundary line of blade 1.

Blade 1 working in the horizontal plane may have any conventional form, for instance a straight front-edge or one or several points to the front.

According to my invention, however, the front-edge of the vertical blades 2 (line BD) and of the horizontally working blade 1 (line BE) adjoining the bend-line AB (Figs. 4 and 5) are given a receding form, whereby the sides of the weeding-hoe at the bend-line AB penetrate into the soil like an arrow. Thus, for the first time, is given the possibility for the weeds even at the outermost margin of blade 1, working in the horizontal plane, to be cut off or to be drawn in to the center of blade 1.

Referring to Fig. 6, according to my invention the blades 1 and 2 including the supports 3 are punched, practically without waste, out of a strip of sheet-steel of appropriate width and fed by the width of the curved vertical blades 2. This punched blank is then given its final form by bending and stamping and the socket is welded thereto.

In the illustrated preferred type of tool the horizontally working blade 1 is provided with arrowlike points the number and form of which is to be chosen according to the use of the weeding-hoe and to the condition of the soil to be worked.

The illustrated preferred type of weeding-hoe according to my invention possesses five arrow-shaped points directed to the front. Also the punched blanks illustrated in Fig. 6 turned along the bend-line AB have practically the same form as the arrowlike points 8; whereby the angle between the bend-line AB and the adjoining portion DB of the front-edges of the vertical blades 2 and the angle between the bend-line AB and the adjoining portion EB of the front-edge of the horizontally working blade 1 are equal. In the illustrated preferred type of tool they about equal the angle of inclination of the plane of blade 1 in working position to the surface of the soil to be worked.

I claim:

A weeding hoe, comprising a blade consisting of a central portion and vertical wing portions integral with said central portion, said central portion having parallel front and rear teeth, each of said wing portions having outwardly curved front and rear edges extending parallel to each other and forwardly of said teeth, the edges of the teeth adjacent the wing portions forming with said wing portions angles of less than 45 degrees, a front outline of a blade being the same as the rear outline of another blade, so that a plurality of said blades may be stamped out of a single metal sheet without waste therebetween, a handle socket, and outwardly curving diverging supports having adjacent ends connected with said socket and divergent ends connected with said wing portions, said divergent supports extending in the same horizontal plane, said central portion extending at an acute angle to said horizontal plane, the longitudinal axis of said socket intersecting said central portion between the front and rear teeth thereof.

References Cited in the file of this patent

UNITED STATES PATENTS

| | | |
|---|---|---|
| 54,087 | Allen | Apr. 24, 1866 |
| 492,364 | Powers | Feb. 21, 1893 |
| 543,266 | Parcells | July 23, 1895 |
| 568,143 | Parcells | Sept. 22, 1896 |
| 686,845 | Fischer | Nov. 19, 1901 |
| 702,821 | Portman | June 17, 1902 |
| 875,391 | Tinsley | Dec. 31, 1907 |
| 1,220,060 | Barden | Mar. 20, 1917 |
| 1,848,651 | Peeler et al. | Mar. 8, 1932 |

FOREIGN PATENTS

| | | |
|---|---|---|
| 312,690 | Great Britain | May 15, 1930 |
| 624,563 | France | Apr. 9, 1927 |
| 973,071 | France | Sept. 6, 1950 |